United States Patent [19]

Floyd

[11] Patent Number: 5,330,148
[45] Date of Patent: Jul. 19, 1994

[54] WHEEL TIEDOWN DEVICE

[76] Inventor: H. Dennis Floyd, Rte. 2, Box 281, Lavonia, Ga. 30553

[21] Appl. No.: 103,689

[22] Filed: Aug. 10, 1993

[51] Int. Cl.5 .......................................... B65D 63/00
[52] U.S. Cl. ................................. 248/499; 224/42.4; 410/20; 410/23
[58] Field of Search ............... 248/499, 503, 505, 154; 224/42.4, 42.39, 42.46 R, 42.18; 410/20, 23, 80, 85, 100

[56] References Cited

U.S. PATENT DOCUMENTS

| | | | |
|---|---|---|---|
| 1,156,540 | 10/1915 | Marquis | 224/42.4 |
| 1,321,742 | 11/1919 | Hendricks | 224/42.39 X |
| 1,323,896 | 12/1919 | Mestars | 224/42.39 |
| 1,814,371 | 7/1931 | Desmond | 224/42.39 X |
| 1,937,769 | 12/1933 | Lute | . |
| 2,055,829 | 9/1936 | Tobin | . |
| 4,130,067 | 12/1978 | Kilgus | 248/499 X |
| 4,227,633 | 10/1980 | Sellberg | 224/42.28 |
| 4,479,746 | 10/1984 | Huber | 410/23 X |
| 4,611,961 | 9/1986 | Iperen | 248/499 X |
| 4,786,223 | 11/1988 | Crissy et al. | . |
| 4,960,353 | 10/1990 | Thorndyke | . |
| 5,011,347 | 4/1991 | Bullock | 410/20 X |

FOREIGN PATENT DOCUMENTS

| | | | |
|---|---|---|---|
| 0311543 | 12/1989 | European Pat. Off. | . |
| 100826 | 3/1962 | Netherlands | 410/20 |
| 715712 | 9/1954 | United Kingdom | 410/20 |

Primary Examiner—J. Franklin Foss
Attorney, Agent, or Firm—Richard C. Litman

[57] ABSTRACT

A wheel tiedown device for securing the wheel of a trailered vehicle to the trailer. The novel device comprises a lasso which encircles the wheel. The handle member of the lasso is tethered to the trailer. The loop of the lasso contacts the sides of the wheel, and is prevented from excessive spreading and from slipping to a position too low on the wheel to secure it by a strap spanning right and left sides of the wheel. A second strap attaches to the loop and extends to the opposite side of the wheel from the lasso handle member. The wheel is secured fore and aft by the lasso handle member and the second strap, one engaging the trailer by hook and eye, and the other being held and tightened in a winch. The lasso is made from a strap, and all connection between the lasso and first and second straps is by passing one strap member through a loop terminating the corresponding strap member. Thus, adjustment is enabled by slippage of one strap through the loop of another. This adjustment occurs when the winch is tightened, slippage enabling the lasso loop and spanning strap to conform to and tighten around the wheel. The resultant tiedown device is uncomplicated, adjusted when being tightened rather than in a separate step, and can be used for either right or left side installation on the vehicle being secured.

5 Claims, 2 Drawing Sheets

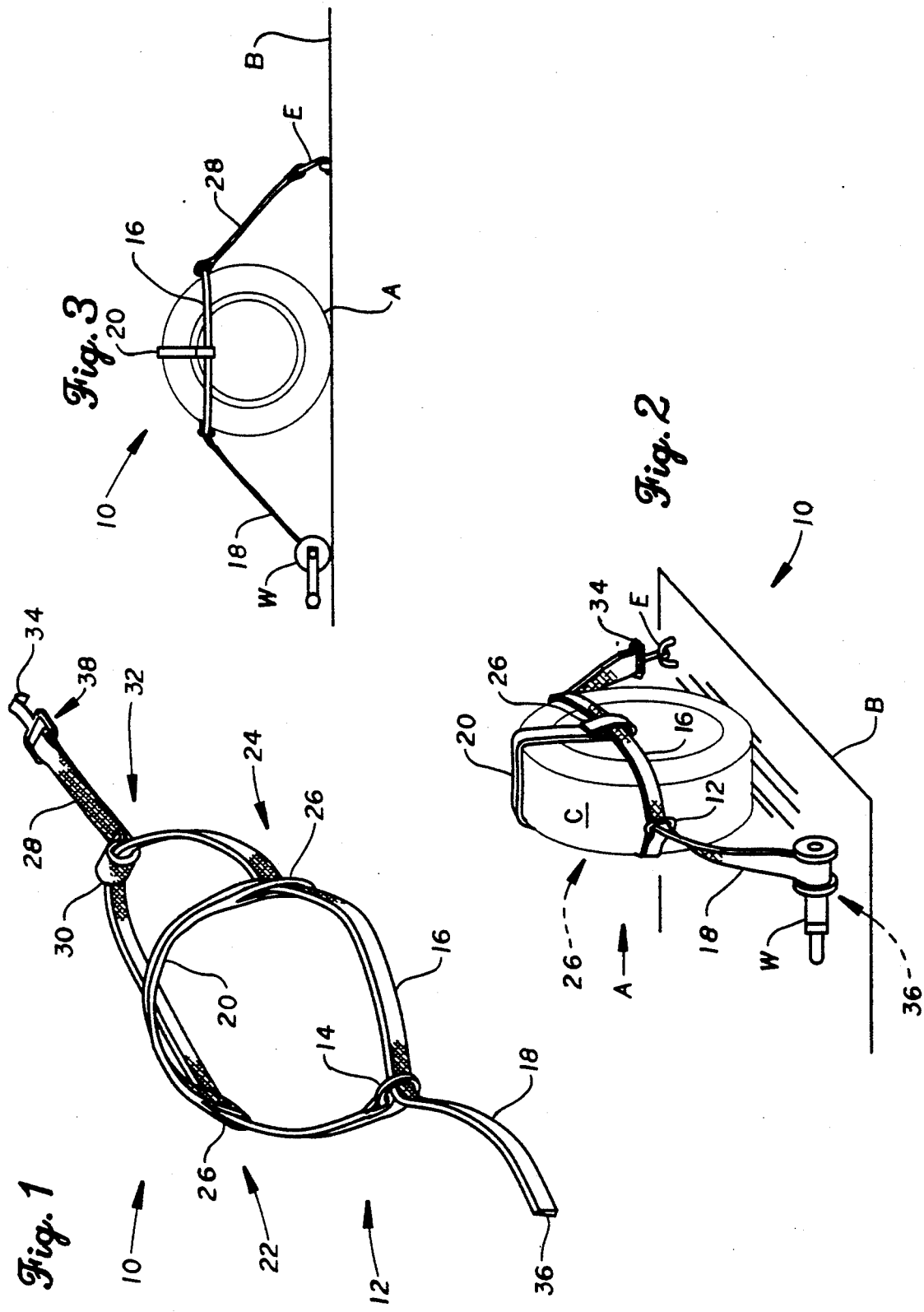

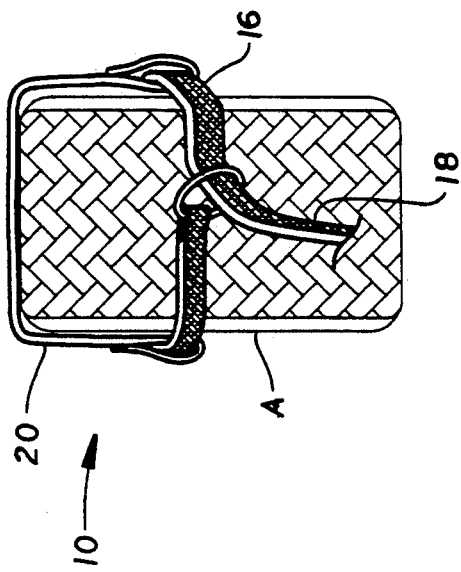
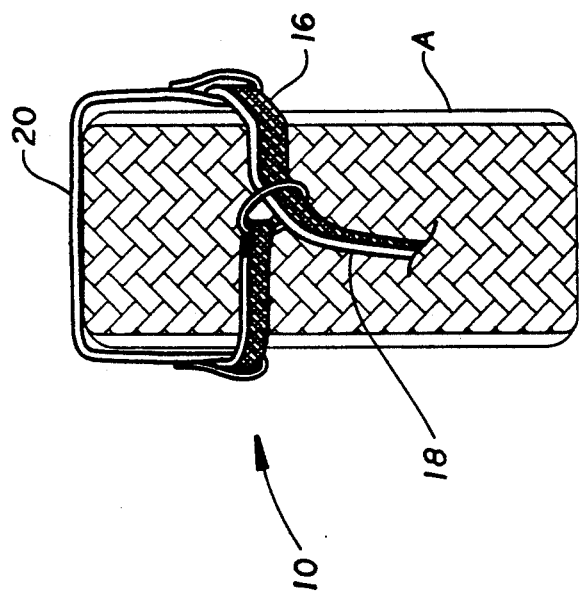
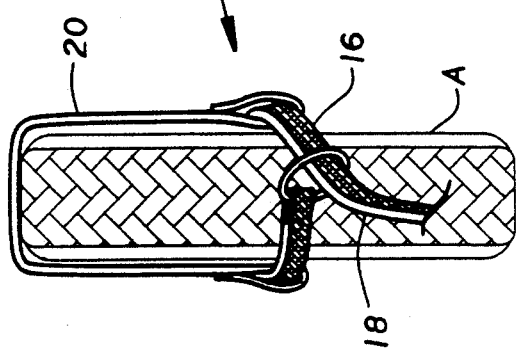

WHEEL TIEDOWN DEVICE

BACKGROUND OF THE INVENTION

1. Field of the Invention

The present invention relates to a tiedown device for securing a wheel of a vehicle carried on a trailer or like conveyance.

2. Description of the Prior Art

Tiedown devices for securing a vehicle by its wheels on a trailer have been the subject of prior art patents. Generally, most vehicles being conveyed are automobiles or small trucks, and have pneumatic tires of dimensions conforming to a plurality of standard sizes. These standard sizes fall within a range of sizes corresponding to the great majority of privately owned vehicles.

Vehicles are transported for a variety of reasons, principally conveyance to a service facility following disablement. Other purposes include marine transport, as on a barge or ferry. All such carriers, wherein the vehicle is supported on a generally flat, horizontal surface, and secured thereto, will be referred to as conveyances. Although discussion herein refers to trailers, the principles presented will be understood to apply to all conveyances.

Specialized trailers and related equipment have been developed in order to provide economical and convenient trailering services to the motoring public.

An example of a strap type tiedown device is seen in U.S. Pat. No. 4,960,353, issued to Robert J. Thorndyke on Oct. 2, 1990 A basket is formed by straps wherein a first strap wraps circumferentially halfway around a vehicle tire, and a lateral connecting strap lies generally diametrically across both sides of the tire. The lateral connecting strap is sewed or otherwise attached to the circumferential strap where the two intersect on the tire tread. There are two such intersections, spaced roughly one hundred eighty degrees apart about the tire circumference.

The diameter of the basket is adjusted by tightening the circumferential member, and then by securing the lateral member by a buckle. This lateral member is not a continuous loop, and is rendered so by the buckle. In summary, the tiedown device of Thorndyke is secured by first tightening one member by pulling, and then manually connecting and tightening a buckle.

A vehicle tiedown system disclosed in U.S. Pat. No. 4,786,223, issued to Charles F. Crissy et al. on Nov. 22, 1988, also includes a basket arrangement partially encircling a tire. Apart from flexure of the flexible straps, there is no adjustment for different tire sizes. The basket arrangement of retaining straps comprises three bands, spaced apart approximately ninety degrees from one to the next. Each band extends from the side of the tire at the rotational axis around the tire to the rotational axis on the opposite side. All three such bands intersect at one point on each side of the tire.

U.S. Pat. Nos. 1,937,769 and 2,055,829, issued respectively to Carl Lute on Dec. 5, 1933, and to Kenneth J. Tobin on Sep. 29, 1936, disclose chain link tiedown devices. The device of Tobin '829 has a circumferential member which divides into two members, each extending concentrically on one side of the tire, then converging to form a unitary continuation of the circumferential member. This arrangement provides one forward tethered member secured to the trailer and one rear tethered member. A basket is formed by plural radially disposed chain segments connecting each concentric member to its counterpart. Each radial segment is formed in two parts which are mutually connected by hook and eye assemblies.

Assembly of the Tobin device therefore requires anchoring fore and aft by hooks, then manually connecting one hook and eye assembly for each radial segment provided. The device of Lute '769 is essentially similar, but no adjustment of the radial segments is provided.

European Patent Office Document No. 0,311,543, dated Dec. 4, 1989, discloses a strap type tiedown device comprising only a circumferential member.

None of the above inventions and patents, taken either singly or in combination, is seen to describe the instant invention as claimed.

SUMMARY OF THE INVENTION

It is in the interest of the vehicle service industry to have inexpensive yet secure trailers and associated equipment which will serve most vehicles owned by the public. To avoid excessive investment in such equipment, each piece of equipment will ideally accommodate as many individual vehicles as possible.

To accomplish the foregoing, and to maintain acquisition costs reasonable, it is preferred to manufacture a tiedown device from straps. Materials for making such straps both strong and durable, while maintaining flexibility and longevity, are well known. Such materials are also inexpensively fabricated and stitched together.

An important advantage of strap construction over chains is that straps slide easily over one another, whereas chains will frequently bind and catch on one another. Slippage of one strap across another is employed in the present invention in adjustment thereof. The same characteristic comes into play at joints. There are four joints, wherein one strap engages another by encirclement. This assures retention of the encircled strap, but enables the encircled strap to slide through the encircling loop. Loops are formed by folding and stitching the strap, or by attaching a conventional delta ring to the strap.

The novel tiedown device comprises a basket arrangement anchored by fore and aft tethers, The basket includes a lasso style loop, wherein the extension comprises one of the tethers. The remaining tether is attached to the loop opposite the first tether.

Lateral spread of the loop is controlled by a single radial strap, which spans the loop. The spanning strap has looped ends, each looped end encircling one side of the lasso loop, which is slidingly retained therein.

One tether engages a stationary eye by hook, and the other is preferably wound on a winch having means to prevent unreeling. When the winch is tightened, the basket tightens around the top of the wheel being secured.

All interlocking of one strap to another is by encircling loop, so that the interior strap slidingly adjusts for the tension applied to the tiedown device. This is a major advance in the art, since a final tightening adjusts the entire tiedown device on any wheel within a wide range of sizes.

Accordingly, it is a principal object of the invention to provide a wheel tiedown device which partially surrounds a wheel being secured and which attaches to a trailer at two points.

It is another object of the invention to provide a wheel tiedown device which accommodates many wheel sizes.

It is a further object of the invention to provide a wheel tiedown device which essentially comprises strap construction.

It is still another object of the invention to provide a wheel tiedown device which adjusts for wheel size while being tightened thereover, thus avoiding a separate adjustment operation.

A further object of the invention is to provide a wheel tiedown device which attaches to a trailer by one hook and one winch.

An additional object of the invention is to provide a wheel tiedown device wherein each strap member connects to another strap member by encirclement, sliding of the encircled member being possible.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a perspective view of the invention.

FIG. 2 is an environmental, perspective view of the invention.

FIG. 3 is an environmental, side elevational view of the invention.

FIGS. 4, 5, and 6 are environmental, front elevational views of the invention showing accommodation to differently configured wheels.

Similar reference characters denote corresponding features consistently throughout the attached drawings.

DETAILED DESCRIPTION OF THE PREFERRED EMBODIMENT

The present invention is seen in FIG. 1 to comprise a harness 10 having three major components, A first and largest member is best described in terms of a lasso, and will be referred to hereinafter as lasso member 12. Lasso member 12 comprises a linear member having a well known delta ring 14 attached to one end. The other end of lasso member 12 is passed through delta ring 14, and extended for a distance. This subdivides lasso member 12 into two components, a lasso loop 16 and a lasso handle 18.

A cross member 20 spans lasso loop 16, attaching thereto at points generally designated 22 and 24, which are preferably diametrically opposite one another with respect to lasso loop 16. Cross member 20 terminates at both ends in slip loops 26 which encircle lasso loop 16.

As employed herein, delta ring 14 is a preferred configuration of a slip ring. A slip ring is made from a material which retains its configuration even when subjected to forces imposed by applying tension to either the strap passing through the ring, or to the strap which terminates in the ring. By contrast, a slip loop is taken to signify a loop formed in a strap by folding the end over and securing it at a point on the strap. A slip ring maintains configuration, whereas a slip loop yields to tensile forces, the original configuration being distorted thereby. Both slip rings and slip loops will, of course, enable the encircled member to slide through the ring or loop without being bound therein, as by friction.

Lasso loop 16 can thus slide through slip loops 26 or 26 when pulled. This enables adjustment for different size wheels, which will be further discussed hereinafter.

The third major component of harness 10 is a tether member 28. Tether member 28 attaches to lasso loop 16 by a slip loop 30 at a point designated 32. Point 32 is generally diametrically opposite delta ring 14, with respect to lasso loop 1G. Tether member 28 has a hook 34 for securing to the trailer.

Turning now to FIG. 2, harness 10 is seen installed over a wheel assembly A, and secured on a trailer bed B. Of course, wheel assembly A is installed on a vehicle, the rest of which is omitted for clarity. The trailer has an eye E and a winch W. Hook 34 engages eye E, and the unencumbered end 36 of handle member 18 is wound around the reel of winch W.

Lasso loop 16 encircles wheel assembly A, contacting the sides thereof and radially contacting circumferential surface C. Cross member 20 spans lasso loop 16 and slidably attaches thereto by slip loops 26,26, and also radially contacts circumferential surface C.

As seen in FIG. 3, as winch W is progressively tightened, lasso loop 16 constricts around wheel assembly A. At the sides of wheel assembly A, lasso loop 16 assumes linear configuration, thus defining a chord with respect to the round configuration of wheel assembly A.

Tightening forces lasso loop 16 to a lowest possible position on wheel assembly A. As seen in FIGS. 4, 5, and 6, the flexible nature of harness 10 enables it to constrict around and conform to wheel assemblies of different dimensions and configurations. Constriction immobilizes harness and, thus, wheel assembly A, and also adjusts harness to the particular wheel assembly dimensions. This is accomplished in one step, thus avoiding separate securement and adjustment steps.

Preferably, harness straps are made from an interwoven, synthetic, polymeric material, such as those including polyamides. Such materials are strong enough to resist breakage and offer little surface friction to oppose sliding contact as a strap passes through a slip ring or slip loop. Such materials also have further desirable properties, such as low economic cost; ease of stitching, for forming slip loops; resistance to deterioration; and requisite flexibility.

Embodiments of the invention other than the principal embodiment described above are possible. For example, it would be possible to produce identical results by locating hook 34 at handle member end 36, and securing tether member end 38, now unencumbered by hook 34, to winch W.

It would further be possible to practice the invention while omitting hook 34 (this situation not shown), wherein one respective end of tether member 28 or handle member 18 is tied, and the other end held in winch W, or even wherein both ends are secured in eyes.

It is to be understood that the present invention is not limited to the sole embodiment described above, but encompasses any and all embodiments within the scope of the following claims.

I claim:

1. A wheel tiedown device for securing a vehicle by at least one road wheel thereof to a conveyance, comprising a harness partially surrounding one road wheel, said wheel tiedown device having:

a lasso member comprising a linear member having proximal and distal ends, said proximal end including lasso slip ring means, and said distal end being passed through said slip ring means, thereby defining a lasso loop of selectively variable dimensions and a handle member, wherein said lasso loop, when placed over a vehicle wheel, partially encircles the wheel by contacting the sides of the wheel, thereby describing a chord on each side of the wheel when tightened, and radially contacting the circumferential surface of the wheel, and wherein said handle member is attached to the trailer at said distal end;

a cross member having proximal and distal ends including first and second spanning slip ring means, said cross member spanning and slidably attaching to said lasso loop at two diametrically opposite points of said lasso loop at the sides of the secured wheel; and a tether member having an end comprising tether slip ring means, said tether member slidably attaching to said lasso loop by said third slip loop at a point diametrically opposite said lasso slip ring means, whereby said tiedown device is automatically adjusted when placed over a vehicle wheel and tightened by pulling on one of said lasso handle and said tether member, 2. The wheel tiedown device according to claim 1, one of said tether member and said lasso handle terminating in a hook.

3. The wheel tiedown device according to claim 1, said lasso member, said cross member, and said tether member being made from an interwoven, synthetic, polymeric material.

4. The wheel tiedown device according to claim 1, said lasso member, said cross member, and said tether member being straps having flat sides.

5. The wheel tiedown device according to claim 4, said lasso slip ring means comprising a delta ring, and said first and second cross member slip ring means, and said tether slip ring means comprising slip loops formed in said straps.

* * * * *